Nov. 1, 1927. Re. 16,781
H. L. HORNING
MANIFOLD CONSTRUCTION
Original Filed July 28, 1917
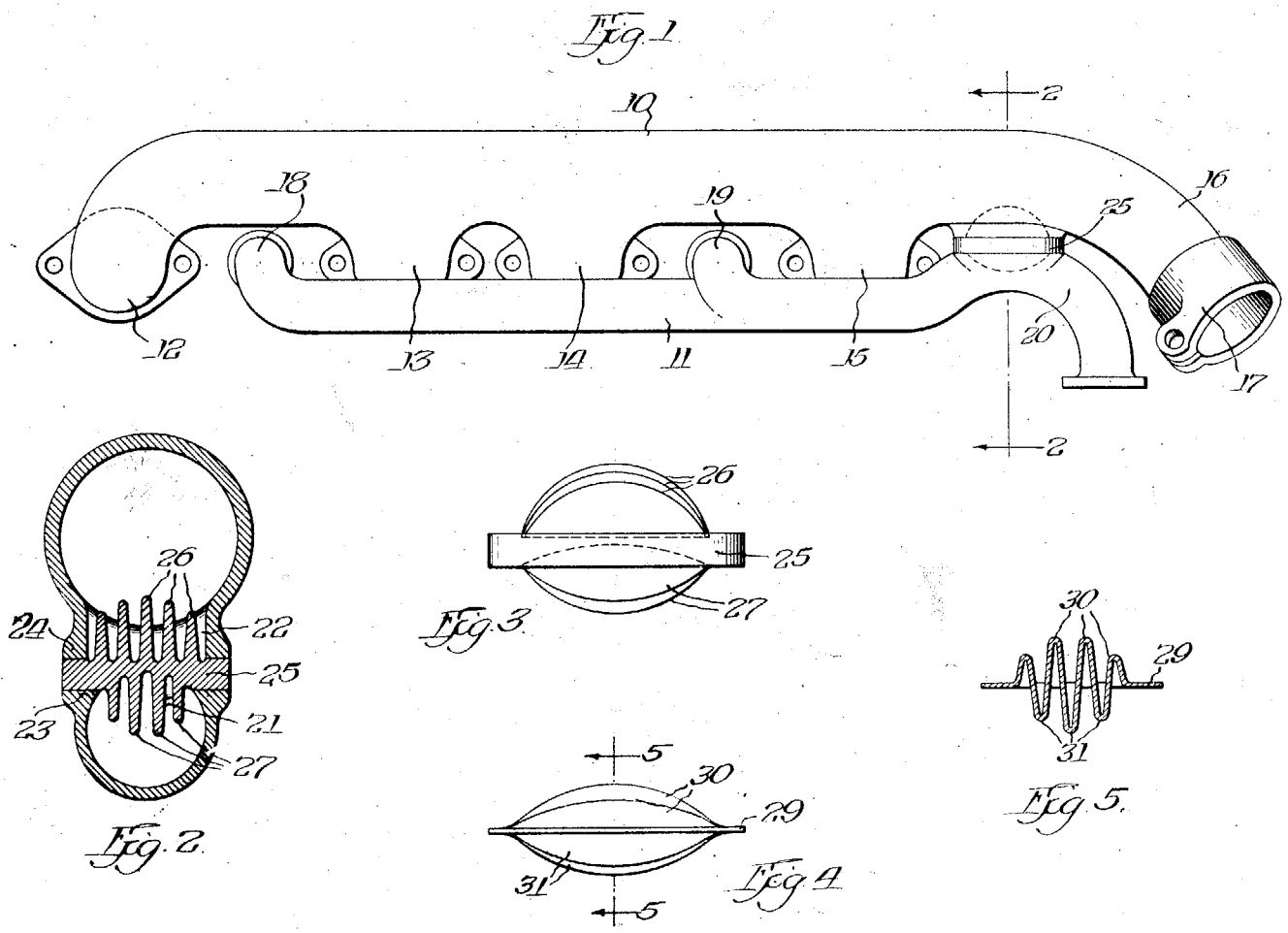
Witness:
Inventor
Harry L. Horning
By Brown, Boettcher, Dienner & Attys Reissued Nov. 1, 1927. Re. 16,781

UNITED STATES PATENT OFFICE.

HARRY L. HORNING, OF WAUKESHA, WISCONSIN, ASSIGNOR TO WAUKESHA MOTOR COMPANY, OF WAUKESHA, WISCONSIN, A CORPORATION OF WISCONSIN.

MANIFOLD CONSTRUCTION.

Original No. 1,479,567, dated January 1, 1924, Serial No. 183,226, filed July 28, 1917. Application for reissue filed April 24, 1924. Serial No. 708,829.

The present invention relates broadly to fuel feed devices for internal combustion engines and has particular reference to an improved construction of intake manifold wherein the mixture previously passed through a carbureting device may have the heavier constituents thereof brought into contact with a heated area so as to vaporize said constituents as the same are thrown against said heated area.

The principal object of my invention is to provide simple and efficient means for separating the heavier particles of fuel as the same are delivered from a carbureting device and for bringing the heavier particles into contact with a heated area to vaporize the same and produce a fuel mixture of good quality. One of the greatest sources of trouble in the modern internal combustion engine is due to the use of a poor grade of gasoline, the heavier constituents of which do not become thoroughly vaporized, and therefore my invention has been designed for use in the proper vaporization of such fuel.

It is also desirable, at times, to use a low grade of fuel such as kerosene or the like and my improved manifold will be found useful in this connection in effectively vaporizing such fuel.

An advantage of the structure shown is that it responds with a very slight time lag to momentary variations in the operating condition of the engine.

Other objects and advantages will appear from the following detailed description and the claims, taken with an inspection of the accompanying drawings, in which—

Fig. 1 is a side elevation of an exhaust manifold and an intake manifold associated and having my invention employed in connection therewith;

Fig. 2 is a vertical section taken on the line 2—2 of Fig. 1 looking in the direction of the arrows;

Fig. 3 is a side view of the "hot plate";

Fig. 4 is a side view of a modified form of "hot plate"; and

Fig. 5 is a sectional view taken on the line 5—5 of Fig. 4, looking in the direction of the arrows.

Referring more particularly to the drawing, wherein similar characters of reference designate like and corresponding parts throughout the various views, 10 designates in its entirety the exhaust manifold of an internal combustion engine and 11 designates the intake manifold. The exhaust manifold 10 is provided at convenient points with the usual connecting elbow extensions 12, 13, 14 and 15 and with the down-turned end 16 which is connected by means of a clamp 17 to a suitable muffling device (not shown). The intake manifold 11 is provided with the usual elbow extensions 18 and 19 which are in communication with the combustion chambers of an internal combustion engine to deliver the explosive charge thereto.

My invention contemplates broadly the separation of the fuel constituents of high boiling point from those of low boiling point and the selective heating of those of high boiling point. It contemplates the separation automatically by the physical characteristics of the constituents. Those of higher boiling point are of greater weight and, in a mixture insufficient in temperature to vaporize them, exist in larger globules. Either or both of these characteristics may be relied on to effect separation. The weight and small surface of the lower boiling constituents compared with weight of the globules of the heavier constituents make separation by centrifugal action effective. This separation by centrifugal action may be effected by a fan or other means or may be effected by determining a certain path for the mixture, as is the case in the specific embodiment herein shown, and described as follows:

The receiving end of the intake manifold 11 is curved as at 20, said curved portion being tangential to the main portion 10 of the exhaust manifold. As best shown in Fig. 2, an opening 21 is formed in the curved portion 20 of the intake manifold at a point where the intake manifold extends, tangential to but spaced slightly from the exhaust manifold. The exhaust manifold is provided with a similar opening 22, the margins of the openings 21 and 22 being reenforced as at 23 and 24.

The margins of the openings 21 and 22 are arranged in spaced relation to accommodate a "hot plate" 25 therebetween, said plate being formed of a casting provided with heat radiating ribs 26 and 27 on its opposite faces, said plate being gripped between the margins of the openings 21 and 22 and said ribs 26 and 27 projecting into the exhaust and intake manifolds, respectively. The intake side of the plate 25 is recessed and the ribs 27 extend from the recess approximately half way the diameter of the intake manifold, as best shown in Fig. 2. The contour of the ribs 26 and 27 is such that the same do not offer any material resistance to the passage of the live or exhaust gases through their respective manifolds, said ribs being arranged parallel to the line of travel of the gases. I do not lay any particular stress upon the contour of the "hot plate" as far as the plan of the same is concerned, since this plate may be circular or rectangular as desired. However, in some instances it would probably be preferred that the plate be rectangular as a greater heating area is thereby afforded.

This hot plate can be placed anywhere in the exhaust manifold where its surfaces are adequately swept by the exhaust gas from the cylinder, it being desirable, of course, to position the plate so that it may receive the maximum amount of heat; to this end it is placed to receive the flame as it emerges from the cylinders.

The position of the plate in the intake manifold has already been explained.

In Figs. 4 and 5 I have illustrated a modified form of "hot plate", the same being formed of a sheet of metal designated 29, said sheet having heat radiating projections 30 and 31 formed thereon, said projections being struck from the sheet alternately in opposite directions, as best shown in Fig. 5. The general contour of the members 30 and 31 is similar to that of the ribs 26 and 27 of the plates 25. The shape of said members is best shown in Fig. 4. In using the "hot plate" 29 the same is applied in the same position as the plate 25 hereinbefore described. Of course, the marginal portion of the plate 29 being of less thickness than the plate 25 will necessitate bringing the manifolds closer together or the insertion of washers to take up the space between the margins of the openings in said manifolds. In some instances where very heavy fuel constituents are used this type of hot plate will be preferred, owing to its superior heat conductivity.

In use the fuel is admitted to the intake manifold after passage through a carburetting device at the curved portion of said intake manifold, and the speed with which the gas passes through the intake manifold causes the heavier particles thereof to be thrown outwardly by centrifugal force into contact with the ribs 27 or 31 as the case may be. The heat from the exhaust manifold is conducted to the ribs on the intake side of the "hot plate" by means of the ribs on the exhaust side of said "hot plate".

The structure shown in Fig. 5 is particularly advantageous because it affords a direct thermal connection between the incoming and outgoing gases, largely independent of the temperatures of the larger masses of metal forming the manifolds. Thus, in starting, as soon as the first few charges of burnt gas have flowed over the hot plate, effective hot spot action occurs in the inlet manifold, long before the exhaust manifold 10 has been heated through. Similarly, when the throttle is suddenly thrown wide open, as in climbing a short steep hill, the increased supply of heat is immediately effective. By the time the top of the hill has been reached and the throttle nearly closed, the manifold 10 has become very hot, but as a relatively large portion of corrugations 30 and 31 is relatively remote from the manifold in terms of thermal connection through the metal, the cooling action of the incoming gases and the heating action of the exhaust determine an instantaneous heat balance only slightly interfered with by the temperature of manifold 10, and the so-called "hot spot" may at such times be colder than the rest of manifold 10 by a surprising temperature difference.

The article may be placed in position on any type of internal combustion engine in which a straight flow intake manifold is employed and in which the receiving end of said manifold is adjacent to the exhaust manifold. Of course, the device is not limited in its application to straight intake manifolds. It will be particularly noticed that the properly vaporized fuel passing through the intake manifold is practically unaffected by the "hot plate"; only the larger or unvaporized particles of the fuel coming into contact with the "hot plate". Thus it will be seen that I have provided means for feeding an explosive mixture to an internal combustion engine and means for separating and properly vaporizing the heavier particles of the fuel supplied.

Various alterations may be made in the detailed structure and in the shape and size of the "hot plate" without departing from the spirit and scope of the invention as claimed.

I claim:—

1. In combination, intake and exhaust manifolds, the former having a curved portion, the convex side whereof is arranged close to the exhaust manifold, said manifolds having aligned openings adjacent the curved portion of the intake manifold, a hot plate consisting of a body disposed between the intake and exhaust manifolds and closing said openings, and provided with oppositely extending ribs arranged in said manifolds and parallel respectively to the lines of flow of gas through said manifolds, to convey heat from the exhaust manifold to the intake manifold and vaporize the heavy particles of fuel delivered to the curved portion of said intake manifold.

2. In combination, an intake and an exhaust manifold, the former having a curved portion, the convex side whereof is arranged close to the exhaust manifold, said manifolds having aligned openings adjacent the curved portion of the intake manifold, a hot plate consisting of a sheet metal body arranged between the manifolds and having a plurality of oppositely disposed heat conducting and radiating ribs struck therefrom, said ribs being alternately disposed in said intake and exhaust manifolds.

3. In combination, intake and exhaust manifolds, said manifolds being close together along a restricted area but otherwise thermally separated, said manifolds having registering openings at said restricted area, a wall closing said openings against direct interflow, said wall being of thin heat conductive metal and having ribs projecting from opposite sides thereof into the exhaust and intake manifolds respectively and extending parallel to the direction of flow therethrough, whereby extensive area will be presented for the rapid transfer of vaporizing heat from the exhaust gases to the unvaporized fuel particles in the intake mixture during a comparatively very short distance of travel of said gases and mixture and without materially heating the entire stream of intake mixture.

4. In combination, intake and exhaust manifolds, said manifolds being close together along a restricted area but otherwise thermally separated, a wall at said restricted area separating said manifolds against direct interflow of gas and intake mixture, said wall being of thin heat conductive metal shaped on opposite sides to present extensive area to the exhaust gases and intake mixture respectively for the rapid transfer of vaporizing heat from the exhaust gases to the unvaporized fuel particles in the intake mixture during a very short distance of travel of said gas and mixture and without materially heating the entire stream of intake mixture.

5. In combination, intake and exhaust manifolds, said manifolds being close together along a restricted area but otherwise thermally separated, a wall at said restricted area separating said manifolds against direct interflow of gas and intake mixture, said wall being of thin heat conductive metal shaped on opposite sides to present extensive area to the exhaust gases for the rapid transfer of heat from the exhaust gases to said wall, said heated wall being positioned to intercept and cause vaporization of the unvaporized fuel particles in the mixture without materially heating the entire stream of intake mixture.

In witness whereof, I hereunto subscribe my name this 12th day of April, 1924.

HARRY L. HORNING.